US010323789B2

(12) United States Patent
Thompson (10) Patent No.: US 10,323,789 B2
(45) Date of Patent: *Jun. 18, 2019

(54) INFANT ITEM HOLDER (71) Applicant: Julie Tabor Thompson, Cumming, GA (US)

(72) Inventor: Julie Tabor Thompson, Cumming, GA (US)

(*) Notice: Subject to any disclaimer, the term of this patent is extended or adjusted under 35 U.S.C. 154(b) by 240 days.

This patent is subject to a terminal disclaimer.

(21) Appl. No.: 13/920,519

(22) Filed: Jun. 18, 2013

(65) Prior Publication Data
US 2013/0277522 A1 Oct. 24, 2013

Related U.S. Application Data (63) Continuation of application No. 12/556,784, filed on Sep. 10, 2009, now Pat. No. 8,480,042.

(51) Int. Cl.
A47D 15/00 (2006.01)
F16M 13/02 (2006.01)
A63H 33/00 (2006.01)
F16M 13/00 (2006.01)
A61J 17/00 (2006.01)

(52) U.S. Cl.
CPC .......... *F16M 13/022* (2013.01); *A47D 15/00* (2013.01); *A63H 33/006* (2013.01); *F16M 13/00* (2013.01); *A61J 17/001* (2015.05)

(58) Field of Classification Search
CPC .......... A63F 2007/4081; A63F 7/3622; A63H 33/042; A63H 33/108; A63H 33/04; A63H 5/00; A63H 33/22; A61J 2009/0638; A61M 5/1415; F16M 13/02; A47G 1/18; A57G 7/047; B60N 2/502; B60N 2/546; B60G 11/28; F21V 21/38; A47F 5/0892
USPC .... 248/104, 328, 617, 106, 320, 327, 125.2, 248/276.1; 446/102, 227, 489
See application file for complete search history.

(56) References Cited

U.S. PATENT DOCUMENTS 1,436,367 A * 11/1922 Sullivan .................. 446/227
2,785,503 A * 3/1957 Schaefer .................. 446/227
(Continued)

OTHER PUBLICATIONS

Baby Einstein Teethe and Tug Pals-Dogs, Product listing and image on Babies R US website, Feb. 9, 2010 2 pages Http://www.toysrus.com/product/index.jsp?productId=2734979. Description of Baby Einstein Teethe and Tug Pals device. Provided by applicant in IDS filed on Mar. 17, 2010 in U.S. Appl. No. 12/556,784.*

*Primary Examiner* — Kimberly T Wood
(74) *Attorney, Agent, or Firm* — Coats & Bennett, PLLC (57) ABSTRACT An infant item holder for holding one or more infant items. The infant item holder may include a base with a passage. The infant item holder may also include an elongated member that is longer than the passage and includes first and second ends. The elongated member may be positioned in the passage with the first end extending from a first side of the passage and the second end extending from a second side of the passage. The elongated member may be movably positioned within the passage and adjustable between a first orientation with the first end in closer proximity to the base than the second end, and a second orientation with the second end in closer proximity to the base than the first end. Infant items may be positioned at the ends of the elongated member.

13 Claims, 7 Drawing Sheets (56) References Cited

U.S. PATENT DOCUMENTS

| | | | | |
|---|---|---|---|---|
| 3,392,729 | A | * | 7/1968 | Lenoir .......................... 606/234 |
| 3,529,820 | A | * | 9/1970 | Templeton ......... A63B 21/0004 |
| | | | | 482/122 |
| 3,614,098 | A | * | 10/1971 | Carr ..................... A63B 21/018 |
| | | | | 24/115 R |
| 3,996,694 | A | * | 12/1976 | Zinser ........................... 446/228 |
| 4,257,592 | A | * | 3/1981 | Jones ................... A63B 21/154 |
| | | | | 24/115 K |
| 4,335,875 | A | * | 6/1982 | Elkin ................ A63B 69/0059 |
| | | | | 482/131 |
| 4,691,917 | A | * | 9/1987 | Battista ................ A63B 21/151 |
| | | | | 482/131 |
| 5,399,137 | A | * | 3/1995 | Kushner .............. A63B 21/018 |
| | | | | 482/114 |
| 5,514,059 | A | * | 5/1996 | Romney ............ A63B 21/0004 |
| | | | | 482/121 |
| 6,434,797 | B1 | * | 8/2002 | Sagman .................. A61J 17/00 |
| | | | | 24/3.1 |
| 2007/0012822 | A1 | * | 1/2007 | Bellamy-Noseworthy ................ |
| | | | | A61J 9/06 |
| | | | | 248/104 |

\* cited by examiner

INFANT ITEM HOLDER

RELATED APPLICATIONS

The present application is a continuation of co-pending U.S. patent application Ser. No. 12/556,784, filed Sep. 10, 2009, entitled "Infant Item Holder." The '784 application is incorporated herein by reference in its entirety.

BACKGROUND

The present application is directed to an infant item holder and, more particularly, to an infant item holder that includes an elongated member that attaches to one or more infant items.

Infants often play with and use various items that occupy their attention. Examples of infant items include but are not limited to pacifiers, toys, rattles, and teethers. These items are designed for infants to view, grasp, hold in their hands, and possibly even put into their mouth. There are many opportunities for the infant to use these items including when they are in a crib, infant carrier, stroller, and car seat.

A problem occurs when the infant drops the item and it moves out of view and/or out of reach. This often occurs due to the infant's inability to adequately hold the item, and may also be compounded by the infant's limited attention span. Losing the item is problematic for the infant who often becomes upset and begins crying. This is also problematic for parents who do not want their infant to become upset. It is particularly frustrating for parents when they are busy and unable to continually retrieve the item.

Prior devices have been developed that attach to an infant item. However, these items are not effective in maintaining an item within the infant's reach and/or view. These devices are often developed to prevent losing the item, but not for an item to remain in view and/or reach of the infant. Further, the devices may still require intervention from a parent who must grab the device and/or item and retrieve it for the infant.

SUMMARY

The present application is directed to an infant item holder for holding one or more infant items. The infant item holder may include a base with a passage. The infant item holder may also include an elongated member that is longer than the passage and includes first and second ends. The elongated member may be positioned in the passage with the first end extending from a first side of the passage and the second end extending from a second side of the passage. The elongated member may be movably positioned within the passage and adjustable between a first orientation with the first end in closer proximity to the base than the second end, and a second orientation with the second end in closer proximity to the base than the first end. Infant items may be positioned at the ends of the elongated member. A first infant item may be positioned in proximity to an infant in the first orientation, and a second infant item may be positioned in proximity to the infant in the second orientation.

The various aspects of the various embodiments may be used alone or in any combination, as is desired.

DETAILED DESCRIPTION

Figure 1:
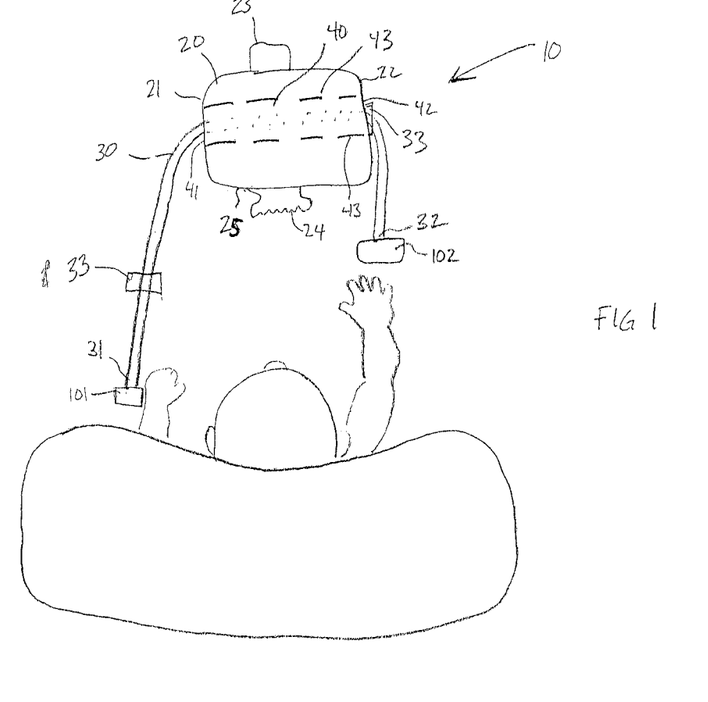
FIG. 1 is a front view of an embodiment of an infant item holder positioned relative to an infant.

The present application is directed to a holder that positions one or more infant items within arms reach and/or sight of an infant. FIG. 1 includes an infant item holder 10 that includes an elongated member 30 that extends through a passage 40 in a base 20. A first item 101 is attached to a first end 31 of the elongated member 30 and a second item 102 is attached to a second end 32 of the elongated member 30. The base 20 is attached to an object in vicinity to an infant such that the infant may see, reach, and pull one of the items 101, 102 down to themselves. The act of pulling one of the items 101, 102 causes the elongated member 30 to move through the passage 40 as the chosen item is pulled towards the infant. Movement of the elongated member 30 causes the non-chosen item to be moved towards the base 20 to be visible to the infant. The infant item holder 10 maintains at least one of the items 101, 102 within sight and reach of the infant.

Figure 2:
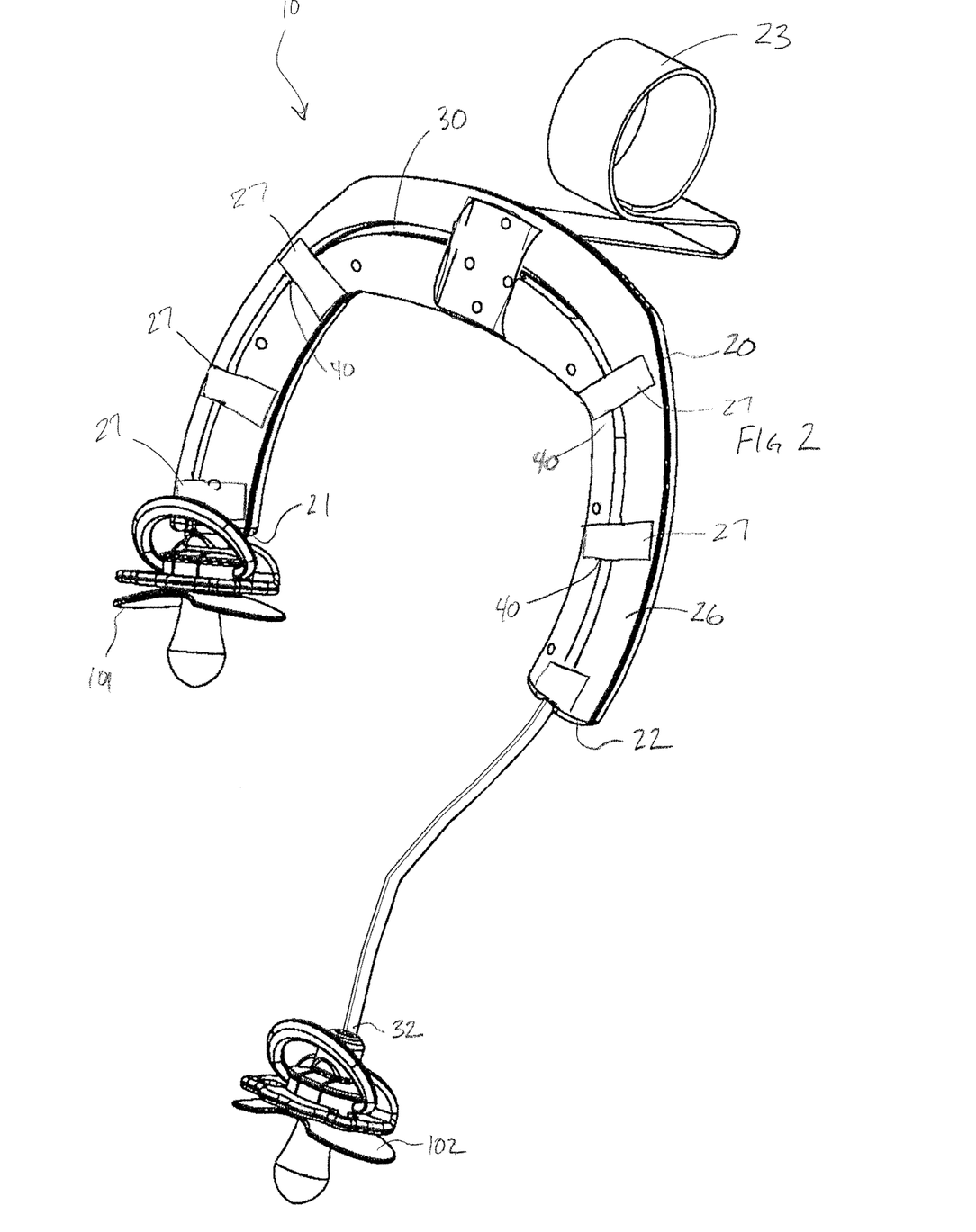
FIG. 2 is a perspective view of an embodiment of an infant item holder.
Figure 3:
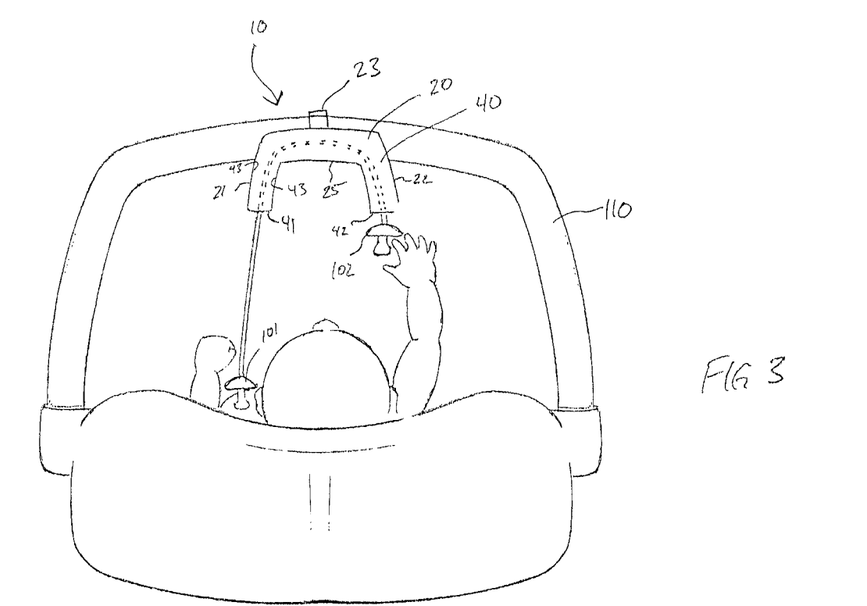
FIG. 3 is a front view of an embodiment of an infant item holder in a first orientation.
Figure 4:
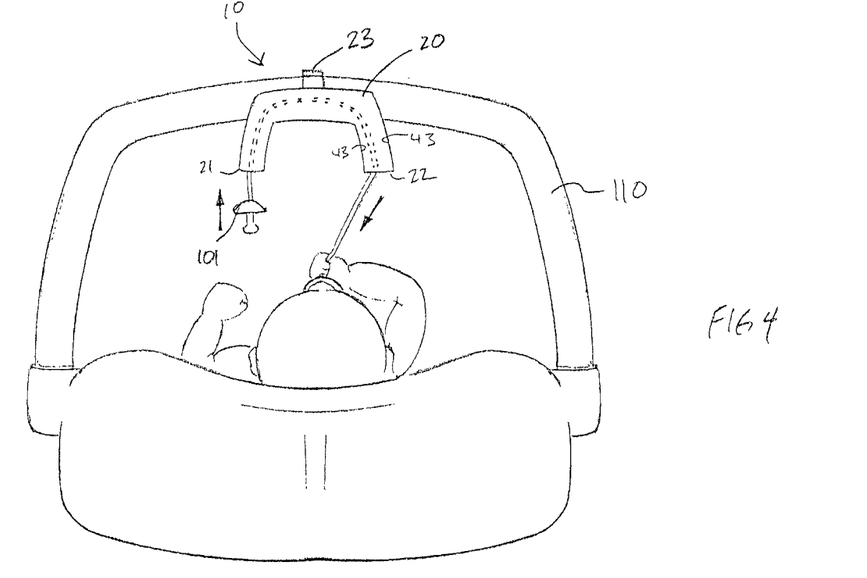
FIG. 4 is a front view of the infant item holder of FIG. 3 in a second orientation.
Figure 6:
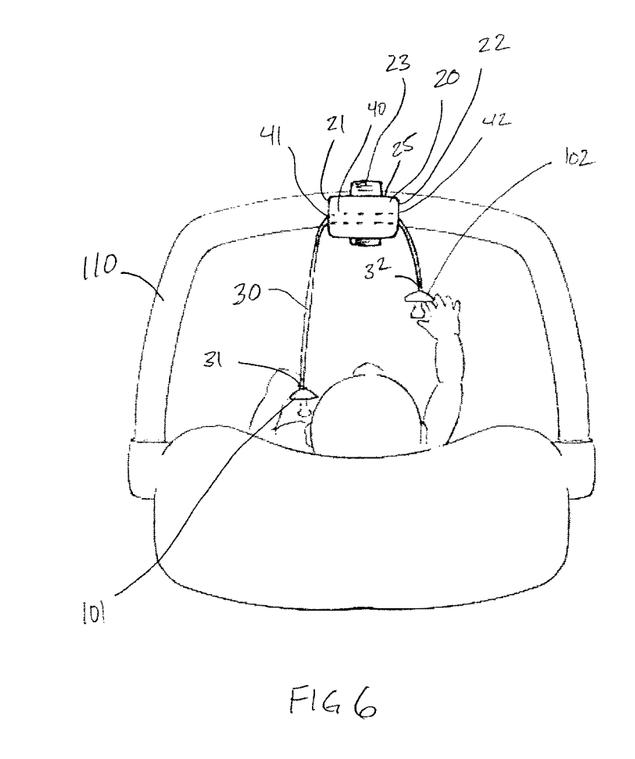
FIG. 6 is a front view of an embodiment of an infant item holder positioned relative to an infant.

The base 20 includes a body through which the passage 40 extends. The base 20 may include various shapes, sizes, and configurations. FIG. 1 generally includes the base 20 with opposing first and second sides 21, 22. The base 20 may also include one or more additional sides 25. FIGS. 2, 3, and 4 each include the base 20 with a U-shape with first and second ends 21, 22 that both face towards the infant. FIG. 6 includes a smaller base 20 with ends 21, 22 that do not face towards the infant. In one embodiment, the base 20 is tubular and forms an elongated hollow cylinder. In one embodiment, the base 20 may be a rigid armature.

Figure 7:
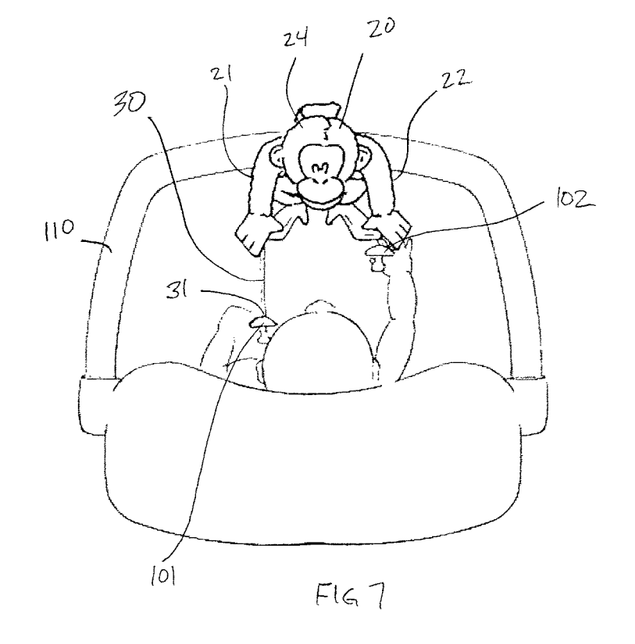
FIG. 7 is a front view of an embodiment of an infant item holder positioned relative to an infant.
Figure 8:
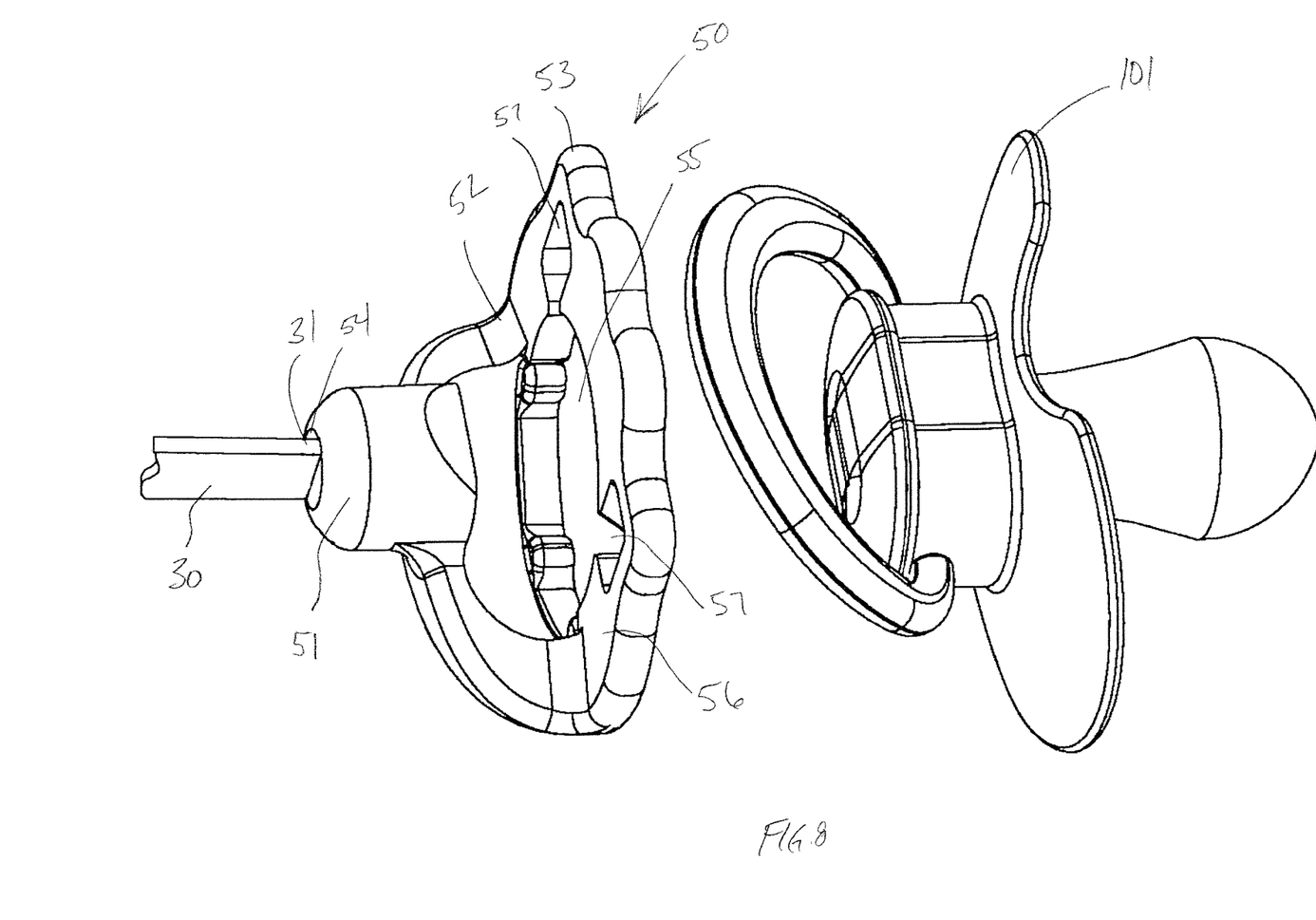
FIG. 8 is a side perspective view of a connector and a detached infant item according to one embodiment.
Figure 9:
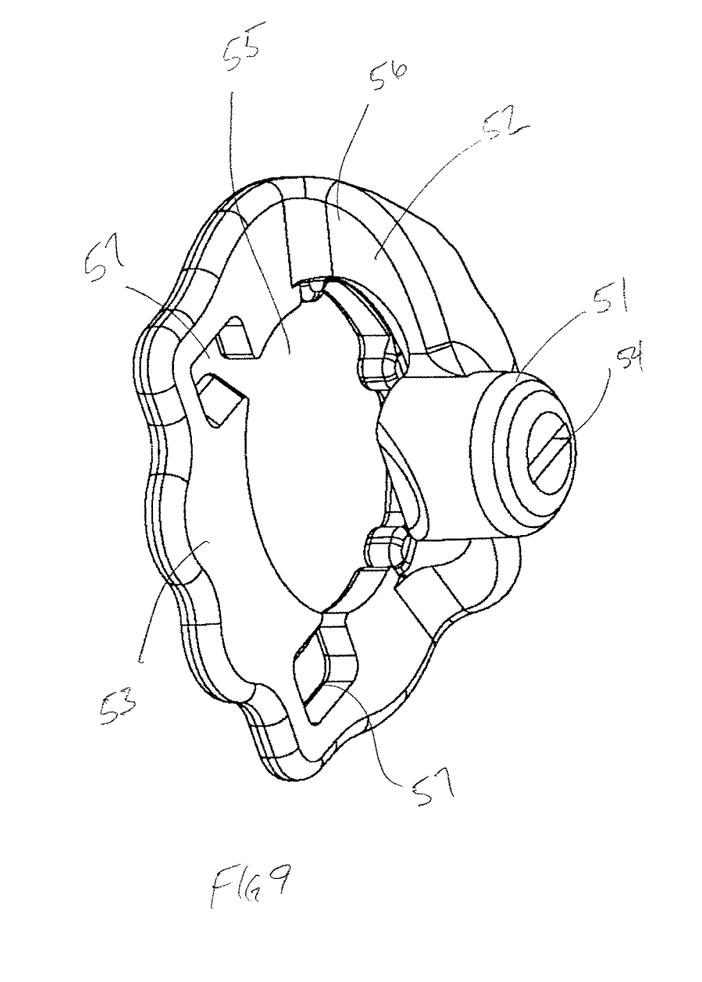
FIG. 9 is a rear perspective view of a connector according to one embodiment.
Figure 10:
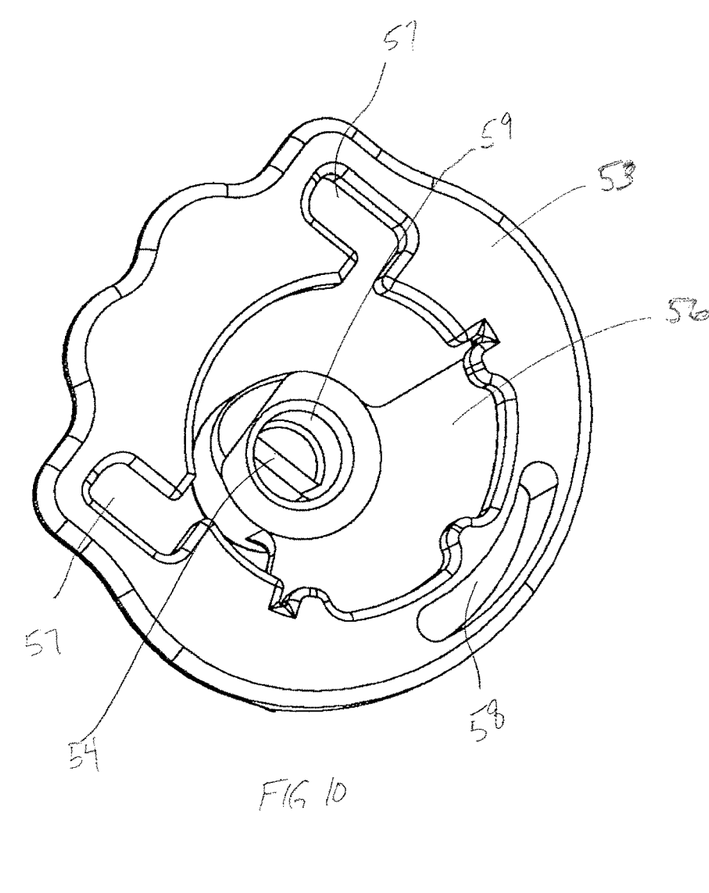
FIG. 10 is a front perspective view of a connector according to one embodiment.
Figure 11:
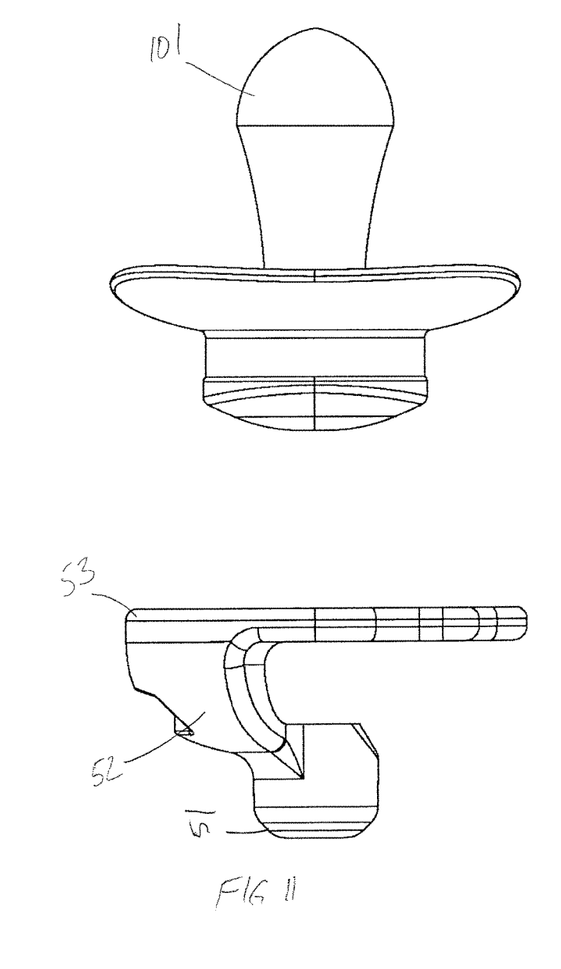
FIG. 11 is a side view of a connector and a detached infant item according to one embodiment.
Figure 12:
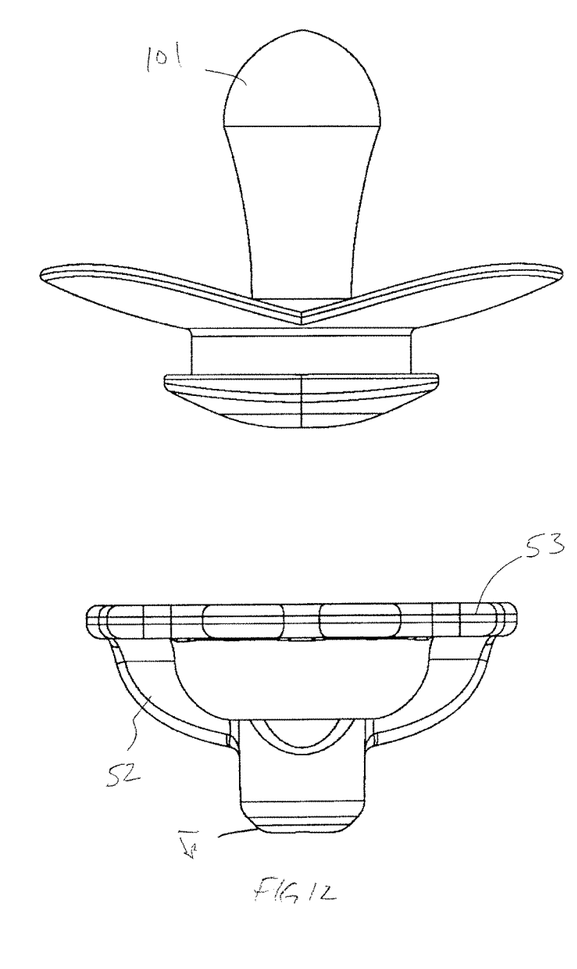
FIG. 12 is a side view of the connector and a detached infant item of FIG. 11 rotated about 90 degrees.

The base 20 may include an aesthetically pleasing decorative feature 24. The decorative feature 24 may include a decorative cover such as a plush toy animal or the like. In one embodiment as illustrated in FIG. 7, the decorative feature 24 includes a cover that extends over the base 20 and has the appearance of an animal with first and second arms that give the appearance that the animal is holding the elongated member 30 and attached items 101, 102. The decorative feature 24 may also be positioned on just a limited section of the body 20, such as a side 25 that faces the infant. FIG. 7 includes the decorative feature 24 having the appearance of a monkey, although various other animals, cartoon characters, shapes, etc. may be used. The base 20 may also be formed to integrally include the decorative feature 24 (i.e., there is no separate cover). One embodiment includes the base 20 molded to include a shape of an animal.

The base 20 may also include an attachment member 23 to attach the infant item holder 10 to a mounting structure 110. FIG. 2 includes a coiled attachment member 23 that may be wrapped around the mounting structure 110. FIG. 6 includes the attachment member 23 as a strap that wraps around the mounting structure 110. The strap may include VELCRO for adjustment and provide a secure attachment to the mounting structure 110. Various other attachment members 23 may be used, including but not limited to one or more apertures sized to receive a fastener such as a bolt, and one or more adhesive strips, clips, or clamps. The mounting structure 110 may include a variety of items including but not limited to a crib, infant carrier, stroller, bouncy seat, and car seat.

The passage 40 extends through the base 20 and is sized to receive the elongated member 30. The passage 40 includes first and second ends 41, 42, and may include a variety of configurations including but not limited to being substantially straight as illustrated in FIGS. 1 and 6, and curved as illustrated in FIGS. 2-4. The length of the passage 40 measured between the first and second ends 41, 42 may vary depending upon the size and shape of the base 20. The width measured between opposing sidewalls 43 may be constant along the length, or may vary along the length. In one embodiment, the width of one or both of the first and second ends 41, 42 is smaller than a remainder of the passage 40 to prevent or reduce the likelihood that one of the ends 31, 32 of the elongated member 30 may inadvertently be pulled into the passage 40.

Figure 5:
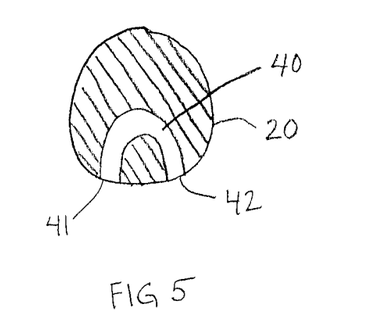
FIG. 5 is a cross-section view of a base according to one embodiment.

The passage 40 may extend through an entirety of the base 20. FIGS. 1 and 6 each include the passage 40 extending through an entirety of the base 20. FIGS. 3 and 4 include another similar structure with the passage 40 extending through the base 20. The passage 40 may also extend through a limited section of the base 20. FIG. 5 includes the passage 40 extending through a limited section of the base 20 with the first and second ends 41, 42 being in close proximity.

The passage 40 may also be formed on an exterior 26 of the base 20. FIG. 2 includes a series of straps 27 that are attached to the exterior 26 of the base 20 to form the passage 40. The straps 27 extend over and maintain the elongated member 30 on the exterior 26. The number and shape of the straps 27 may vary. Each of the straps 27 may be the same, or two or more may include different shapes and/or sizes. One embodiment includes the passage formed by a single strap 27.

The elongated member 30 is sized to extend through the passage 40 and connect to each of the infant items 101, 102. The elongated member 30 includes a first end 31 and an opposing second end 32. A length of the elongated member 30 measured between the first and second ends 31, 32 is greater than a length of the passage 40. This sizing provides for at least one of the ends 31, 32 to remain within reach of the infant. The elongated member 30 may be constructed from various materials, including but not limited to string, ribbon, spring, and cord. The elongated member 30 may also be constructed from combinations of two or more of the materials. An intermediate section that contacts against the sidewalls 43 of the passage 40 may be constructed of a first material that avoids abrasion or other-like weakening, and each of the ends may be constructed of a different material.

As illustrated in FIG. 1, positioners 33 may be attached to the elongated member 30. Each positioner 33 is larger than the size of the passage end 41, 42 where it is attached. The positioners 33 prevent certain sections of the elongated member 30 from moving into the passage 40. The positioners 33 may be positioned at the ends 31, 32 of the elongated member 30 to prevent the ends 31, 32 from moving into the passage 40. The positioners 33 may also be positioned inward from the ends 31, 32 as illustrated in FIG. 1. This positioning provides for the ends 31, 32 to remain in the vicinity of the infant to ensure the infant items 101, 102 remain within sight and reach.

FIG. 1 includes two positioners 33 attached to the elongated member 30 with a first positioner 33 positioning the first end 31 relative to the base 20 and the second positioner 33 positioning the second end 32 relative to the base 20. The device 10 may also include a single positioner 33 attached to the elongated member 30 to position one side of the elongated member 30.

The positioner 33 may include various configurations. Positioner 33 may include a knot in the elongated member 30 that is larger than the ends 31, 32. The positioner 33 may also include a separate member that is fixedly attached to the elongated member 30. One embodiment includes a block with a central aperture that receives the elongated member 30. In embodiments with multiple positioners 33, the positioners 33 may be the same or different.

The infant items 101, 102 are attached to the ends 41, 42 of the elongated member 30. The infant items 101, 102 may be the same, or may be different. A variety of different infant items 101, 102 may be accommodated, such as pacifiers as illustrated in FIGS. 2-4 and 6-7. Other infant items 101, 102 that may be attached to the ends 41, 42 include toys, rattles, and teethers. The width of the items 101, 102 may be larger than the width of the ends 41, 42 to prevent the items 101, 102 and the ends 31, 32 of the elongated member 30 from being moved into the passage 40. An infant item 101, 102 may be attached to each end 31, 32 of the elongated member 30, or to just one end of the elongated member 30.

One or more connectors 50 may be attached to the ends 41, 42 to connect the elongated member 30 to the one or more infant items 101, 102. FIGS. 8-12 illustrate one embodiment of a connector 50. The connector 50 includes a connective section 51, a transitional section 52, and a mounting section 53. In one embodiment, the connector 50 is an integrally molded elastomeric component. The connector 50 may be flexible, allowing it to flex and stretch to receive and secure the infant item 101, 102.

The connective section 51 includes an opening 54 for receiving an end 31 or 32 of the elongated member 30. The opening 54 leads into an interior space 59 that is larger than the opening 54. The structure provides for the end 31 or 32 to be threaded through the opening 54 and into the interior space 59. The end 31 or 32 may be knotted, tied to the infant item 101, 102, or otherwise secured to prevent escape back out through the opening 54.

The transitional section 52 extends between the connective section 51 and the mounting section 53. The transitional section 52 may include various structures, including one or more arms. The transitional section 52 may also provide a space that receives a portion of the infant item 101, 102.

The mounting section 53 provides for attachment of the infant item 101, 102. The mounting section 53 includes a mount 56 that forms an opening 55 sized to receive the infant item 101, 102. The mount 56 may completely or partly extend around the opening 55. One or more cut-outs 57 extending into an inner edge of the mount 56 and are in communication with the opening 55. The cut-outs are sized to receive the infant item 101, 102. One or more additional openings 58 may also extend through the mount 56. In one embodiment, the mounting section 53 is substantially planar.

In one embodiment, the connector 50 is configured to hold a pacifier. The connector 50 positions the pacifier so that the nipple is colinear with the elongated member 30 allowing it to be in a proper position for the infant's mouth.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. An infant item holder comprising:
a base that includes a curved interior longitudinal passage that extends through and is enclosed within the base, the passage includes a first end at a first terminal end of the base and a second end at a second terminal end of the base, the passage having a first length measured between the first and second ends of the passage;
an elongated member that extends through the passage with a first end of the elongated member that extends outward from the first end of the passage at the first terminal end of the base and a second end of the elongated member that extends outward from the second end of the passage at the second terminal end of the base, the elongated member having a second length measured between the first and second ends, the second length being greater than the first length;
a first infant item attached to the first end of the elongated member;
a second infant item attached to the second end of the elongated member;
the elongated member movably positioned in the passage between a first orientation with the elongated member extending farther outward from the first end of the passage than the second end of the passage, and a second orientation with the elongated member extending outward from the second end of the passage farther than the first end of the passage;
wherein the first and second infant items are pacifiers.

2. The infant item holder of claim 1, wherein the first and second ends of the passage are on opposing sides of the base.

3. The infant item holder of claim 1, wherein the first and second ends of the passage are oriented in a common direction.

4. The infant item holder of claim 1, wherein a second end of the elongated member contacts against the base in the first orientation and a first end of the elongated member contacts against the base in the second orientation.

5. The infant item holder of claim 1, wherein the base is rigid.

6. The infant item holder of claim 1, wherein the passage includes a fixed shape that does not change during movement of the elongated member in the passage.

7. An infant item holder comprising:
a rigid base with a passage, the passage including a passage length, the passage extends through an entire length of the base and includes a first end at a first terminal end of the base and second end at a second terminal end of the base, the passage including a bend;
an elongated member with a length measured between first and second ends, the length of the elongated member being greater than the passage length with the first end extending outward from the first end of the passage and the second end extending outward from the second end of the passage, the elongated member being narrower than the passage;
first and second infant items;
a first connector attached to the first end of the elongated member to hold the first infant item;
a second connector attached to the second end of the elongated member to hold the second infant item;
an attachment member attached to the base between the first and second terminal ends, the attachment member comprising a body that extends away from an outer side of the bend, the body configured to engage with a support and to connect the base to the support such that the first and second terminal ends of the base face outward away from the support;
the elongated member movably positioned in the passage between a first orientation with the first connector positioned a greater distance from the base than the second connector, and a second orientation with the second connector positioned a greater distance from the base than the first connector.

8. The infant item holder of claim 1, further comprising an attachment member attached to the base between the first and second terminal ends, the attachment member comprising a body that extends away from the base in a direction opposite from the first and second terminal ends to connect the base to a support such that the first and second terminal ends of the base face outward away from the support.

9. The infant item holder of claim 7, wherein the passage includes a fixed shape that does not change during movement of the elongated member in the passage.

10. The infant item holder of claim 7, wherein the first connector is larger than the passage to prevent the first connector from moving into the passage.

11. The infant item holder of claim 7, wherein the passage extends through opposing sides of the base.

12. The infant item holder of claim 7, wherein each of the first and second connectors includes a receptacle to removably hold the first and second infant items respectively.

13. The infant item holder of claim 7, wherein a majority of the elongated member is positioned within the passage.

* * * * *